(12) United States Patent
Agrawal et al.

(10) Patent No.: US 6,373,618 B1
(45) Date of Patent: Apr. 16, 2002

(54) CHROMOGENIC GLAZING FOR AUTOMOBILES AND DISPLAY FILTERS

(75) Inventors: Anoop Agrawal; Raymond Zhang; Jonathan M. Boulton, all of Tucson, AZ (US)

(73) Assignee: Schott-Donnelly, LLC, Tucson, AZ (US)

( * ) Notice: Subject to any disclaimer, the term of this patent is extended or adjusted under 35 U.S.C. 154(b) by 0 days.

(21) Appl. No.: 09/565,999

(22) Filed: May 4, 2000

(51) Int. Cl.[7] .............................. G02F 1/15; G02F 1/153; B05D 5/12
(52) U.S. Cl. ..................... 359/265; 359/275; 359/254; 427/125
(58) Field of Search ................................ 359/265, 275, 359/254, 241; 427/125

(56) References Cited

U.S. PATENT DOCUMENTS

| | | | | |
|---|---|---|---|---|
| 5,073,011 A | * | 12/1991 | Ito et al. | 359/265 |
| 5,223,976 A | * | 6/1993 | Fujie et al. | 359/507 |
| 5,956,170 A | * | 9/1999 | Miyagaki et al. | 359/275 |
| 5,994,840 A | * | 11/1999 | Forsdyke et al. | 313/635 |
| 6,219,173 B1 | * | 4/2001 | Udaka et al. | 359/272 |
| 6,245,262 B1 | * | 6/2001 | Varaprasad et al. | 264/1.31 |
| 6,246,505 B1 | * | 6/2001 | Teowee et al. | 359/241 |

* cited by examiner

Primary Examiner—Loha Ben
Assistant Examiner—Tim Thompson
(74) Attorney, Agent, or Firm—Howard R. Popper (57) ABSTRACT

A transparent chromogenic panel in which color changes are selectively effectable over predefined areas comprises a pair of facing glass substrates each covered with a conductive layer divided into individual energizeable areas each provided with as set of busbars. An electrochromic electrode layer overlies at least one of the conductive layers. An insulating adhesive sealant spaces apart the substrates and insulates the busbar sets from each other and from exposure to the electrolyte and the electrochromic layer, so that each busbar set may be individually energizeable to effect a color change through a respective one of the individual areas. A passive layer is advantageously superimposed over one of the substrates, its color being chosen so that the color and the transmissivity of the passive layer accommodates the range of color change and transmissivity of the electrochromic layer to maintain the transmitted color of the panel in a warm or neutral shade.

36 Claims, 3 Drawing Sheets

CHROMOGENIC GLAZING FOR AUTOMOBILES AND DISPLAY FILTERS

FIELD OF THE INVENTION

This invention relates to glazing and, more particularly, to chromogenic glazing for use in applications, such as automobiles and display filters, where it is desirable to reversibly alter the transmission or tinting of the glass.

BACKGROUND OF THE INVENTION

Automobile windshields, movable and fixed side and rear windows, and divider panels between the front and the rear cabin, as well as sunroofs, employ various forms of glazing in a variety of colors and intensities. Typically, when tinted glazing is employed, the windshield and the front side windows are clear for safety reasons. Car glazing may provide for management of both ultra violet and infra-red solar energy penetration to enhance user comfort while reducing the power requirements for air-conditioning. Besides the need to carefully control tinting so that glass used in adjacent windows does not appear to be mismatched, it is important to consider the effect that glazing color can have on passengers'skin tones. For example, some colors, such as deep violet glazing may make the interior colors appear dull and/or strange and cause the skin tones of passengers to appear unnatural.

To adapt chromogenic glass, i.e., glass which has user-controllable transmissivity, for use in automobiles, it is important that the glass exhibit several characteristics:
1. Chromogenic glazing should be able to match its tint to the color of the car's interior.
2. Chromogenic glazing should be available in "warm" tones and in "neutral" tones.
3. Chromogenic glazing should not acquire an unacceptable color when it is changed from clearer to a darker state under user control.
4. Chromogenic glazing should maintain an acceptable color appearance from the outside, e.g., it is preferable that all of the windows should have similar color properties while permitting the depth of coloration of the windows (and of the sunroof) to vary.
5. Chromogenic glazing for use in a windshield may be colored or bleached to a different shade or color as compared to the other windows to maintain safe, non-glaring conditions during driving.
6. Chromogenic glazing should maintain a desired state of color without consuming too much battery power when the vehicle is parked for a long period of time.

Problems With Prior Art Chromogenic Glass

When a formulation for chromogenic glass is adopted, considerable thought is is given to selecting and processing the materials in order for the glass to meet a desired transmission range, durability and environmental resilience, i.e, performance over a range of temperature, typically between −40 to 100C, varying humidity, and solar radiation. Electrochromic (EC) devices used in automobile glazing should not drain the battery even when left parked in the darkened state. In automobile glazing the aesthetics of color choice play an important role. Automobile manufacturers currently prefer glazing colors which are "neutral" or "warm" so that the flesh tones of the driver and passengers and the interior colors will not be cast in an unappealing light. Certain EC materials, such as those that derive their color principally from tungsten oxide, can typically color to a blue tint and maybe undesirable in some circumstances because their color change fails to meet the neutral/warm criteria. To meet the desired characteristics, such EC materials must be modified by doping so that they will color to a more neutral shade, but in doing so the coloration range may be compromised. Other compromises made in material selection may affect durability because of electrochemical changes in the material. In addition, glazing used in an automobile windshield may need to have different transmissivity and color characteristics as compared to the side or rear windows and sunroof While some chromogenic devices may be available that change to a more neutral color, they may not conform to the desired transmission range required for the various locations. The chemical modification of such materials to meet these diverse applications is a daunting task.

It is therefore an object of the present invention to accommodate the different "tunability", "transmissivity" and environmental attributes required of glazing destined for diverse applications, without entailing the time and expense required to formulate a new EC material having the desired characteristics.

SUMMARY OF THE INVENTION

The above noted problems of chromogenic glass for use in various glazing applications are solved in accordance with the principles of the present invention by providing a transparent chromogenic assembly in which color changes are selectively effectable over predefined areas of the assembly which comprises a pair of facing glass substrates separated by an electrolyte. A conductive transparent coating is deposed on facing surfaces of the substrates, the conductive coating of at least one of the surfaces being interrupted to define individual areas each of which is provided with as set of busbars, advantageously of silver frit. An electrochromic electrode layer overlies at least one of the conductive layers. An insulating adhesive sealant spaces apart the substrates and insulates the busbar sets from each other and from exposure to the electrolyte and the electrochromic layer, so that each busbar set may be individually energizeable to effect a color change through a respective one of the individual areas. Advantageously, the electrochromic layer may comprise a transition metal oxide or a mixture containing at least one transition metal oxide, preferably tungsten oxide, while a counterelectrode layer on the facing surface may comprise a mixture of at least three oxides, preferably two of which are transition metals and one of them is an alkali metal. A portion of each busbar advantageously extends from the facing surface to and over a respective edge of the substrate to form a connector for the terminal electrode that provides exceptional mechanical stability.

Further in accordance with the invention, it is important to select those attributes which allow chromogenic devices to exhibit low leakage currents, e.g., by employing inorganic EC and counterelectrodes that are selected principally from the transition metal oxides, such as tungsten oxide and vanadium oxide, respectively, and by using sulfolane or its derivatives in fall or part as the solvent and/or plasticizer in the electrolyte when a solid polymer matrix electrolyte is used. Further, the water content of the electrolyte is preferably lower than 2000 ppm, more preferably lower than 100 ppm and most preferably as low as 10 ppm.

According to another aspect of the invention, in one illustrative embodiment, a transparent chromogenic assembly is provided which comprises an active component layer and a passive component layer in which the active component layer is selected from the group consisting of electrochromic, liquid crystal, user-controllable-photochromic, polymer-dispersed-liquid crystal or suspended particle devices and the passive component layer is selected from the group consisting of substrates or covers for the active layer, the active and the passive layers being chosen so that the color and the transmissivity of the passive layer accommodates the range of color change and transmissivity of the active layer to maintain the transmitted color of the assembly in a warm or neutral shade, where warm colors correspond on the L*C*h color sphere scale to C having an approximate value between 15 and 45, preferably between 18 and 30; h having a value between 115 and 20, preferably between 40 and 100, and L having a value dictated by the desired degree of glass darkness or preferred degree of photopic transmission. A preferred counterelectrode composition consists of Li, Ni and Mn oxides to facilitate obtaining the desired color change as an intrinsic attribute of the EC device.

BRIEF DESCRIPTION OF THE DRAWING

The foregoing and other features of the present invention may become more apparent when the ensuing description is read together with the drawing, in which

FIGS. 2A and 2B depict respective isometric views of portions of the facing substrates while FIG. 2C shows a cross section A—A view through an illustrative EC assembly according to the invention;

GENERAL DESCRIPTION

As pointed out in PCT application WO 98/08137 and in WO 99/09112, the disclosures of which are hereby incorporated by reference, chromogenic members may be made by a variety of techniques including electrochromic materials, liquid crystal technology, user-controllable photochromic, polymer dispersed liquid crystal, incorporation of suspended particles, etc.

To achieve the degree of tunability in color and transmissivity desired for automobile glazing, a colored substrate layer may be combined with a layer of EC material or an exterior non-chromogenic cover may be used over the EC material. Typical practical chromogenic devices for this purpose will have a contrast ratio (ratio of bleached to colored transmission) from about 3:1 to about 20:1. A colored substrate layer added to the EC layer balances the different needs for shading, privacy, clarity, UV and IR blocking that arises in different types of automobiles and at the different glazing locations in the same car. The color of the substrate or of the cover glass should preferably be neutral or should be chosen so as to bring out a "warmth" quality of the color and be synchronous with the car exterior. When a colored glass is used it is preferable to mount the EC so that the colored substrate or cover is facing the exterior of the car so that some or considerable amount of the solar energy is absorbed by the outer glass, firstly to provide UV barrier and secondly to reduce the temperature rise of the EC panel due to energy absorption.

An EC device according to the invention may be made using clear substrates which are laminated (e.g., using poly vinyl butyral, polyvinyl chloride or polyurethane, etc. plastic sheet) to a colored glass sheet. Tint and UV blockers may be incorporated in such a plastic sheet. However, if such a sheet is colored, then a clear glass may also be substituted for the colored glass.

Using An Appropriate Substrate

As described above, one of the substrates, or the cover glass, should preferably bring out warmth in color or be neutral. If the EC device in the bleached state does not have substantial color, any kind of cover glass will impose its own coloration. Thus, if a particular EC device goes from colorless to blue, then a brownish (or warm) cover will allow the device to perceived as being warm in the bleached state and being near neutral in the colored state because brown is a complimentary color to blue.

However, if a 20% transmitting gray colored exterior cover is used, for example, in a sunroof, the sunroof will always be perceived from the outside as being gray during the daytime regardless of the color of the EC panel inside. Thus, the color of the outer glass and its transmittance may solely determine the appearance of the glass from outside for a sunroof during the day. Colors with warmth are described below.

Warm colors on an L*C*h color sphere scale correspond to C between 15 and 45, and h between 100 and 20, while L depends on the darkness of the glass or preferred degree of photopic transmission. Neutral colors correspond to C less than 15, preferably less than 5, and h between 0 and 360, while L can be any number within the desired photopic transmission as given below. The color can also be expressed on an any other scale, such as CIE (Y, x, y), or L*a*b, etc. For convenience, the L*C*h scale will be used herein. The "C" and "h" in the L*C*h are related to "a" and "b" in the L*a*b scale by:

$C = \sqrt{(a^2+b^2)}$ and $h = \tan^{-1}(b/a)$.

For the darker windows, including the sunroof, it is preferred that the bleach transmission should be in the range of 15 to 70% and more preferably in the range of 15 to 35% photopic transmission (i.e., transmission measured over the range of visible wavelengths), although the solar transmission could be different. This range of transmission provides sufficient privacy during daytime when viewed from outside, provides a clear view from inside and allows entry of sufficient daylight to the interior. In the colored state, the preferred photopic transmission range is below 10% and most preferably below 5%. For windshields and front side windows which, preferably, do not use colored glass, the preferred photopic transmission should be greater than 70% in the bleached state to comply with federal safety specifications for motor vehicles. Further, the haze of such windows should be lower than 2%, preferably lower than 1% and most preferably lower than 0.5%. To avoid direct glare from the sun during the day and make driving safer, the photopic transmittance of chromogenic windows in this application in the colored state should be lower than 20%, and preferably lower than 15%. While there is no generally accepted specification for minimum transmission, it is reasonable to set a photopic transmission level that is analogous to that of sunglasses where a photopic transmission in the range of 5 to 20% is usually employed.

A substrate for chromogenic glass can be made in different ways to have the preferred color and can be tempered and coated with transparent conductors, such as indium tin oxide by sputtering or by chemical vapor deposition of fluorine doped tin oxide on a glass float line such as used in the manufacture of Sungate 500. PCT application WO 98/08137 describes several constructions of chromogenic devices using various substrates and the use of an outer glass is used to mask the inner chromogenic glass.

EC devices can be made from commercially available clear transparent conductors. The outer glass could have the desired warm or neutral color. If the EC device is clear (not colored) in the bleached state, then a warm colored cover will result in a warm color being perceived by the viewer. If the EC colors blue, then a warm color such as brown (which is approximately complimentary to blue) will result in a neutral color being perceived. However, it is not only the color of the filters which are combined but also how deep the coloration is. For example, if deep blue is combined with light brown, the composite may still be perceived as blue.

Warm colors are typically bronzes, brown, gray-brown and gray-bronze glass in these colors are made by several manufacturers. As an example PPG (Pittsburgh, Pa.) has several glasses both coated and batch, some of these along with their transmittance specifications are: Solarbronze tinted (52% visible and 46% solar transmittance), Sungate 300 Solarbronze (Visible 44% and 30% solar transmittance), Sungate 300 Solarcool Bronze (18% visible and 19% solar transmittance) and Optibronze (29% visible and 20% solar transmittance in 4 mm thickness). Such glass is made by coating glass or adding additives to glass composition so that it acquires this color, called batch glass. Since the coatings could scratch, preferred glass for automotive application is made by batch processes. Laminating a colored plastic sheet between two glass panels could also make glass with an acceptable color. Examples of neutral colored glasses are GL20 and GL35 from PPG. Their specifications of photopic transmittance are 20% and 35% and their Solar transmittance are 16 and 29% respectively in 4 mm thickness. Their $L^*C^*h^*$ values and photopic transmittance was measured in our laboratory using a Hunter Lab Ultrascan XE instrument (Reston, Va.). According to the lab measurements the $L^*C^*h$ value of GL-20 were <$L^*C^*h^*$ 47, 0.94, 243> and photopic transmittance was 16%. For GL-35 these numbers were <$L^*C^*h^*$ 66, 1.6,125, and photopic transmittance of 35%. It is not necessary that all substrates have to be bulk glass, they can be glass laminated with the plastic inner layers (laminating layers such as poly vinyl butyral, polyurethane, polyester, vinyl, etc.). These plastic sheets may be optionally tinted to obtain the desired color as well.

An EC sunroof which uses Optibronze ($L^*C^*h^*$ 59, 23,73) as the exterior glass cover in combination with an EC device underneath it will have a warm color in the bleached state as long as the interior EC panel does not contribute to the color too strongly. The photopic transmission of the Optibronze sample measured in our laboratory was 27%. The EC device can color to a different color, e.g., to a blue color or a green color. For the blue coloring EC panel, the passenger inside the car will perceive that the sunroof is coloring to a gray (neutral color).

For car glazing, the outer panel, if separate from the interior EC panel, should preferably block the UV. This could be the outer panel of the EC device or be only a cover glass as described above. The outer glass should block the UV and have an absorption edge between 320 and 400 nm. Absorption edge (i.e., wavelength $\lambda$) means that as the wavelength of the light is decreased from the visible into the UV, the panel should start absorbing the light increasingly and that its absorbance should reach 2 at this $\lambda$.

The desired degree of absorbance characteristic within the EC device can be obtained by appropriate doping of the tungsten oxide preferably with other oxides. Also, the electrolyte may be modified by adding UV absorbers. However, another effective way, without modifying the device, is to block UV external to the EC device. This can be done by using a substrate which is UV blocking and/or a cover which blocks the UV. Absorbance is the logarithmic (to the base 10) ratio of uninhibited intensity of light to the intensity of such a light beam after it passes through the substrate. An absorbance level of 2 indicates that the glass at that wavelength is only allowing 1% of the incident light to pass through. The wavelength, where the absorbance reaches 2 is defined as the absorption edge. For use in automotive glazing, below the absorption edge ($\lambda$) the glass should continue to increase in absorbance or maintain this level of absorbance up to 290 nm or lower wavelengths.

Figure 1:
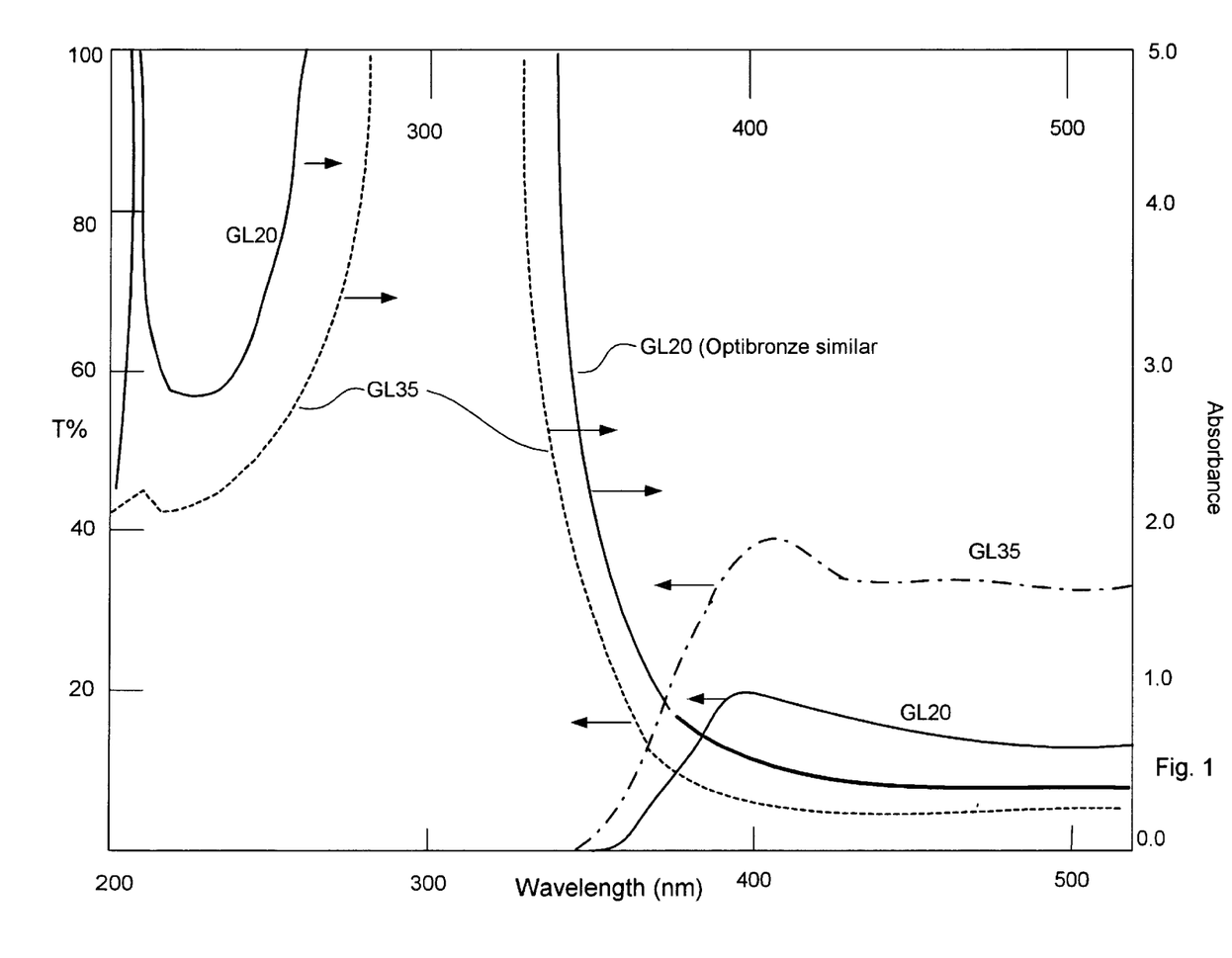
FIG. 1 shows plots of the transmissivity (T) of various glasses over the range of visible wavelengths.

Referring now to FIG. 1, the transmissivity and absorbance of several glasses are shown. GL20 glass and Optibronze have an absorption edge at 350 nm, and GL 35 has an absorption edge at 340 nm at a thickness of 4 mm. The absorption edges for both are very sharp, in that that they reach an absorption value of almost 5 at 340 and 330 nm respectively. These glasses also retain absorbances of greater than 5 at least down to 290 nm and Optibronze retains its absorbance of greater than 5 down to at least 200 nm.

When multiple substrates are used, such as separate cover over an EC panel separated by vacuum, air, krypton, argon or other gases, it would be beneficial to further coat the surfaces of the cover and the EC devices with low-e and/or anti-reflective (AR) coatings. Low-e coatings would enhance the energy efficiency of such glazing and the AR coatings would reduce multiple reflections and hence increase optical clarity from the various surfaces in contact with air, vacuum or gases. As an extension of the technology, at least one of the substrates or the cover glass may be made out of a photochromic material to provide extra depth of darkening that would be a useful addition under bright conditions to the darkening effected by the chromogenic device. This method can also be used in non-glazing applications such as eyewear. The preferred colors for such photochromic substrates are browns (warm) and grays (neutral). Exemplary plastic photochromic substrates are manufactured by Transitions TM by Transitions Optical, Inc., Pinellas Park, Fla. and exemplary glass substrates are PhotoGray Extra®, PhotoBrown Extra®, PhotoSun II® manufactured by Coming, Coming, N.Y.

Using An Appropriate Substrate Coating

Another way to select the substrate materials where the color primarily arises due to the coatings beneath the transparent conductive coating. Since, the transparent conductor faces inside the EC device, and most kind of chromogenic devices require two substrates, the colored coatings cannot be scratched during the use.

Using Appropriate Active Materials

One can also obtain the EC devices which color to a warm tone without the use of colored substrates, i.e., by using active materials (electrolyte, EC and counter electrodes) in the electrochromic devices which result in this color. Such embodiments are shown in FIGS. 2A through 4. When the EC devices are made by using two substrates, 10, 20 facing each other with an electrolyte 29 "sandwiched" between them one could use a permanent color in the electrolyte to generate the required color in the bleach state. For those EC devices where a chromogenic coating and/or counterelectrode 19, 28 (see FIG. 2C), is required, one could select materials so that the desired color is achieved. For example it was discovered by experimenting in the laboratory that when the typical blue coloring tungsten oxide was used for chromogenic coating, e.g., 28 on one of the substrates, e.g., 20, and combination of metal oxides was used for the counter electrode, e.g., 19 on substrate 10, the resulting EC device had the warm color. The transparent conductive substrates 15, 21, 28 and the electrolyte 29 used were clear.

The composition of the counterelectrode 19 contained manganese oxide and or nickel oxide. Manganese oxide has different colors depending on its oxidation state, e.g., MnO is green, $Mn_2O_3$ is black and $Mn_3O_4$ is purple red. However, hereinafter for convenience, reference will be made to the oxide as "MnO", without mentioning the valence state of manganese. It should be understood that any of the valence states may be employed depending on the color desired. The manganese oxide coatings, when incorporated into the counter electrode of the EC cells (with tungsten oxide being employed in the EC electrode), exhibited the warm color. Preferred oxides as additives to this mixture for the counterelectrode were oxides of Li, Na, K, Ni and Co. Manganese oxide must be present in the counterelectrode so that the Manganese is at least 20 atomic % of all the other metal cations (excluding hydrogen which may be present as water or as OH groups).

Further, the tungsten oxide used as the chromogenic layer 28 in the above devices could itself be doped with oxides of Li, Na, K or other oxides to impart desirable characteristics to the device. For example, pending patent application Ser. No. 09/443,109 gives several examples of how tungsten oxide could be doped by other oxides to impart UV resistant characteristics. This reference is incorporated herein by reference. When the device colors, the tungsten oxide coating colors blue but the device color changes from light bronze to blue-bronze or gray. However, if the tungsten oxide coating colors neutral (such as for doped tungsten oxide in U.S. Pat. No. 5,847,858, WO 99/08153 and patent application No. 09/443,109, now U.S. Pat. No. 6,266,177, then more of the bronze or brown color will be retained in the colored state of the device as well. For the above doped neutral coloring tungsten oxides one could additionally use the preferred dopants such as oxides of Cr, Co, Cu and P as described in the aforementioned patent application to give them enhanced UV resistance. Different tungsten oxides can be used and many of them can doped to give different colors such as from blue to neutral gray. Here it should be noted that Cr, Cu and Co, etc described in our patent application Ser. No. 09/443,109 may also be added to these compositions.

Another important aspect for the chromogenic glazing of cars is its ability to maintain a desired state of color without consuming too much battery power. When the vehicles are parked for long periods of time this can lead to severe battery drainage and cause inconvenience to the user. Also, for several types of chromogenic devices, particularly for the EC devices the change in transmission set by the user and the accompanied charge consumed by the device tend to increase with increasing temperature. Our analysis shows that the chromogenic windows in cars parked in direct sunlight may heat up to 65 to 95C in hot summers in many parts of the world. Thus the chromogenic glass should typically consume low power and hold their transmission when subjected to these temperatures. Some type of devices using specific liquid crystals and suspended particles may not even have the required contrast at these temperatures, as discussed earlier the minimum photopic contrast (ratio of bleached to colored state) should be 3:1. Thus for a glazing to be useful, it must meet the colored and transmission levels described above and consume low power. For cars and those applications which have large window areas and depend on battery power, the change in photopic transmission at a temperature of 85–105 C should be less than 10% in fifteen minutes, and preferably less than 2% when the powering voltage is removed. To maintain a constant transmission, the power can be applied continuously or intermittently. Various ways to power chromogenic devices is explained extensively in the patent application Ser. No. 09/1347,807. Alternatively, at this temperature the average leakage current (averaged over time) to maintain a constant transmission should be less than 100 $\mu A$ (micro-amp)/$cm^2$, and more preferably 10 $\mu A/cm^2$, and most preferably less than 1 $\mu A/cm^2$. It is not uncommon to see the leakage current over the active electrochromic window areas increase by a factor of ten or more at 85C when compared at room temperature (nominally 25C). There are several ways to reduce the drain on the battery, such as the use of supplementary power sources (meaning other than the main battery powering the automobile) including Solar cells; Joule-Thompson effect (thermoelectric) based electric generators and auxiliary rechargeable batteries. Also more efficient power circuits such as those using switching power supplies can be used to step down the voltage more efficiently. However the most preferred device would be one in which, intrinsically, low power is consumed by the EC device for a cost effective solution and, advantageously, any of the above may be combined together to achieve low leakage current. Also, sensors and sleep circuitry may be employed to keep the average current consumption within limits. One way is to sense by a photo-sensor when it is nighttime, and if the car is parked then to automatically turn the power off to the chromogenic system when the ignition is turned off, simultaneously or after a pre-set time. Next day, when the sun comes out, the chromogenic windows can again be energized. This sequence can be continued over several days, and then the sleep circuitry (if used) can take over where the power is cut off to the chromogenic system until the user returns and starts the car. Chromogenic panels for automotive and other applications where conservation of battery power is important should not require an average current exceeding 100 $\mu A/cm^2$ of active area over an 8 hour period at 85 C to maintain a particular state of coloration.

Chromogenic Construction

Chromogenic windows may be installed as separate members and framed together as one large window or a unit. However in doing so, due to individual seals, busbar areas and play between different sections one could loose visual area. For example when framing is used to put together windows for architectural use (skylights, windows, etc) or for transportation (windows in cars, planes, boats, buses and trains, etc.) the width of the frame in which these sections are accommodated can be typically 0.5 to 2 inches wide (referred to as the non-active area). Also for chromogenic devices, particularly for the EC devices, as the section size in each window increases, in typical constructions their kinetics (speed to color and bleach) will decrease. One way to eliminate the slowdown is by the use of internal busbars as discussed in application Ser. No. 09/347,807.

Figure 2:
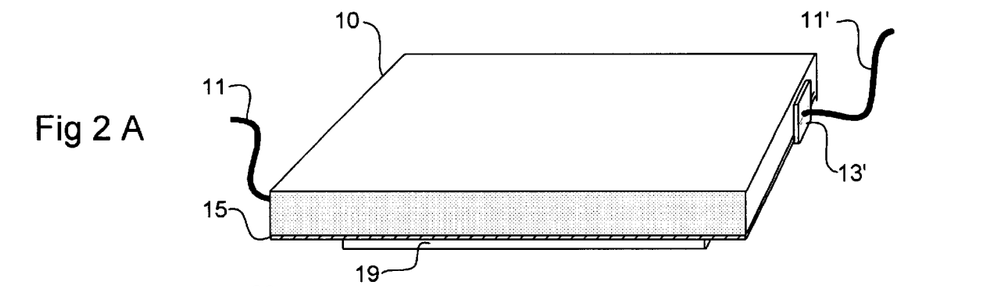

In many situations it is desirable to have sections of chromogenic panels which are independently controllable without incurring the penalty of excessive "dead" (inactive) areas caused by the need to have a frame around each area. FIGS. 2, 3 and 4 show several ways in which it is possible to achieve multiple sections in a monolithic device in which the width of the non-active area is significantly reduced; e.g., a typical range may be 0.01 mm to 10 mm, or preferably between 0.1 to 5 mm. However, the separation between active areas (which is achieved by the interruption or deletion of the transparent conductive coating as, for example, by etching) should preferably be wider than 0.1 microns to provide adequate electrical isolation. As an example in a car sunroof, one may partition a monolith chromogenic device in two so that each of the driver and the passenger can independently control the tint of a respective portion without diminishing the expanse of the sunroof by the need to use individual frames for each portion. In addition, each sunroof section may even be tied to separate air-conditioning system so that, depending on the choice of the passenger and driver, the tint of the panel on top of their bodies will be synchronized with their individual temperature and/or shade preferences.

Another advantage of partitioning without the need for individual frames is that cost is reduced. For example, for a EC skylight of a building one may produce four separate EC panels say 1 ft×1 ft in size and frame them together to yield a 2 ft×2 ft EC panel. These could then be installed in the skylight for example, as described in the WO 98/08137. Alternatively, in accordance with the framing elimination concept of the present invention, one may start with 2 ft×2 ft substrate, and divide the conductive area in four equal square parts by etching away the transparent conductive coating preferably to a width of at least 0.1 microns. This alternative construction achieves the performance of separately made or framed panels, but at reduced cost. For example, a skylight of significantly larger size and superior performance can be fabricated using only two substrates and one set of wiring rather then eight or four sets, respectively, where it is not necessary that each of the skylight cells needs to be independently controlled. If, for esthetic reasons, it were desired to provide a "framed" appearance, any number of cosmetic dividing bars of any desired width could be used over the monolithic construction without incurring the cost penalty necessitated by prior art individual frame construction of the separate EC panels.

FIGS. 2, 3 and 4 show electrochromic devices which utilize an EC and a counterelectrode, however the principals of this construction can be used for any type of EC devices, suspended particle devices, etc. FIGS. 2, 3 and 4 are not drawn to scale. In FIG. 2A, a substrate 10, typically glass, forms the top of an illustrative assembly according to the invention together with a the bottom substrate 20 which is shown in FIG. 2B. FIG. 2C is a cross sectional view, A–A', of the composite assembly showing the respective EC or counter electrode layers 19, 28, the insulating spacer/sealant element 27 and an electrolyte 29. Referring to FIG. 2A the upper substrate 10 has deposited thereon a conductive transparent coating 15 (illustratively, tin oxide or Indium tin oxide) which functions as a counter electrode. In addition, a layer 19 may be deposited over the conductive coating 15 and layer 19 may be chosen of materials that exhibit EC behavior if desired.

Figure 3A:
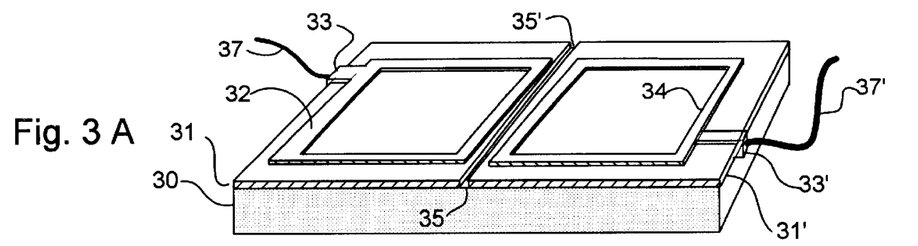
FIG. 3A depicts an isometric view of an alternative embodiment of one substrate.

As more clearly shown in FIG. 2B, 2C and 3A, the upper and lower substrates are provided with highly conductive busbars, advantageously of silver frit, deposited over the transparent conductive layer, for example by silk screen process. It is preferred that the busbars surround at least 3 sides of the periphery of the transparent conductive layers. Thus, substrate 10 has quasi-peripheral busbars 17, 18 and substrate 20 has quasi-peripheral busbars 22, 24 while substrates 30 and 40 of FIGS. 3 and 4 have busbars 32 and 34 and 47 and 48 that surround all four sides of the associated transparent conductive layer. Use of the busbars provides for more even application of current so that a faster color change will be produced throughout the EC layer when electric currents are applied. Referring to FIGS. 2B and 2C it is preferred that a portion of each busbar 22, 22' extend from the facing surface of the substrate to and over a respective edge to form a respective connector portion 23, 23' to facilitate the attachment of terminal wires 11, 11', illustratively by soldering. To facilitate connections, connectors 23, 23' are advantageously located at edges 23' of the lower substrate 20 that are diagonally opposite to the locations of the connectors 13, 13' of the upper substrate 10.

Advantageously a tungsten oxide electrochromic layer 25 on the lower substrate 20 may be used together with a LiNiMnO or vanadium oxide counterelectrode layer 19 on the upper substrate 10 to facilitate obtaining the desired color change as an intrinsic attribute of the EC device.

With respect to lower substrate 20, the transparent conductive layer corresponding to the upper transparent conductive layer 15 is split into two segments, 21 and 21' so that the hue and/or density of coloration produced in the left and right hand portions of the assembly may be separately controlled by potentials applied between wires 11 and 26 at the left and between wires 11' and 26' at the right. It is thus an advantage of the illustrative construction that color difference between left and right hand sections may be obtained with minimum "non-active zone" separation between the EC active elements, a separation dictated by the thickness of dividing line 25–25' which separates the transparent conductive layers 21, 21' while the counter electrode layer 19 and the EC layer 25 may be continuous. As mentioned above, layer 19 may also advantageously exhibit EC characteristics if desired.

In FIG. 2C the electrolyte 29 is shown sealed between substrates 10 and 20 by means of peripheral seal/spacer element 27 which is advantageously black in color and which protects and insulates busbars 22 and 24 from electrolyte 29 and from EC/counter electrode layer 19 of the upper substrate 10 and from the electrolyte 29 and the EC layer 28 of the lower substrate 20. Connectors 13 and 13' connect wires 11 and 11' to transparent conductive coating 15 of upper substrate 10 by making contact with bus bars 22 and 24 respectively. Although shown as separate elements in the drawing, it should be understood that connectors 13 and 13' may in practice be formed by extended respective portions of busbars 22 and 24 from the facing surface of substrate 10 to its left- and right-hand edges. Having the connector portions extend to the edges of the substrate yields more surface and greater mechanical stability for effecting the soldering of wires 11, 11' to connect to the conductive transparent layer 15. Similar remarks apply to wires 26 and 26' and connectors 23 and 23' of lower substrate 20.

Figure 3B:
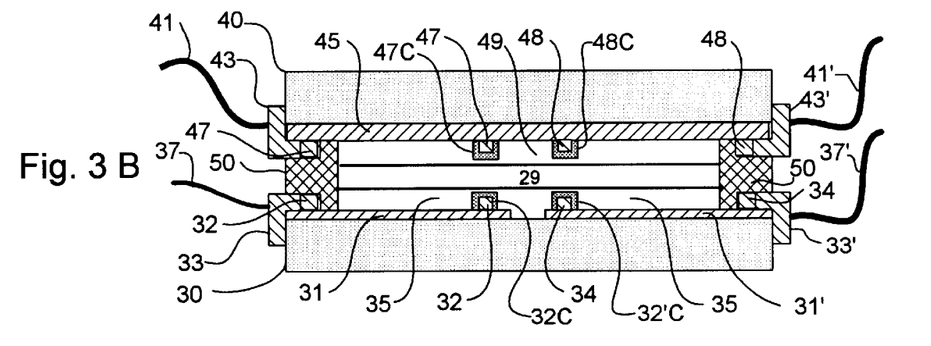
FIG. 3B shows a similar cross section through the alternative embodiment; employing substrate of FIG. 3A.
Figure 4:
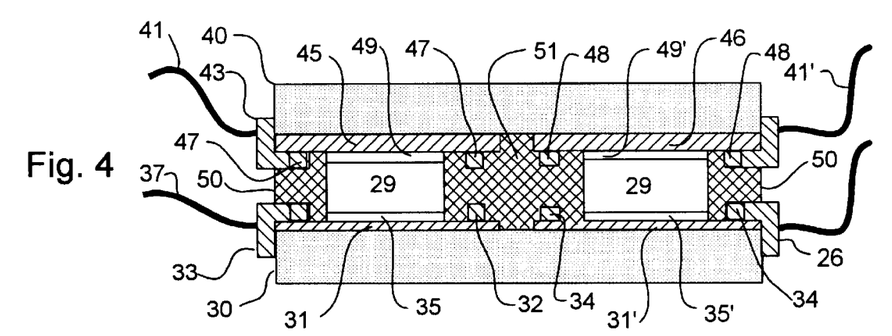
FIG. 4 shows a cross section through a further alternative embodiment.

Referring now to FIG. 3A a substrate embodiment alternative to that of FIG. 2A is shown in which the busbars 32 and 34 substantially completely surround the periphery of the left and right hand colorable sections of the lower substrate. FIG. 3B shows a cross sectional view of an assembly in which busbars 32, 34 of upper substrate 40 and busbars 47, 48 are of the type generally shown in FIG. 3A are employed. To protect those sections of busbars 32, 34 and 47, 48 not otherwise shielded from contact with electrolyte 29, a passivation coating 32C, 34C and 47C, 48C is applied to these portions.

Passivation materials used are those which do not participate in any electrochemical reaction and do not conduct ions. It is further preferred that these are also electronically insulating. It is also preferred that they have good adhesion to the underlying layers which are principally frits, conductive metal and ceramic lines and the transparent conductors. If solid or liquid electrolytes are used it is preferred that they have good adhesion and wetting respectively. Some examples of these are epoxies, urethanes, silicones and acrylic adhesives and lacquers which do not contain any conductive fillers. These can be one part or multi-part formulations. They can be thermosets or thermoplastics. They may have adhesion promoting agents such as silanes which are common in the adhesive industry. Further the passivation layer may not be a single layer but multiple layers, e.g., the first layer could be a silane primer or something else to promote adhesion, and the second layer could be one of the materials described above. Other than the class of materials described above these can also be inorganic oxides, or organic-inorgainc hybrids. An example of the first one is silica, alumina, etc, and of the second where such materials are modified by organic moieties. These layers can be deposited by screen-printing, photolithographic processes, dispensing, wet-chemical deposition (e.g., silica using alkoxides such as tetra ethyl ortho silicate, colloids, etc.), sputtering, evaporation, chemical vapor deposition, etc.

In FIG. 4 a similar construction to that shown in FIGS. 3A and 3B is depicted, however, instead of a passivation coating being used on sections of the the busbars that would otherwise be exposed to the electrolyte, a comprehensive peripheral sealant 50, 51 is used. This however has the disadvantage that the separation between colorable sections of the assembly may have to be wider because of the thickness of the sealant along the separation line 35, 35'.

It should be realized that while flat substrates are shown in the drawing for purposes of simplicity, substrates may be curved to accommodate a desired automobile appearance. There are several chromogenic constructions and methods to make such glazing. For example a car sunroof can consist of an outer panel with one or more interior panels. The interior panels can be chromogenic and the exterior of a color which matches with other glazing color. The interior panels could be flat and the outer one can be curved. The transmissivity of each interior panel can be independently controlled, as for example, by the driver and the passenger. However, it is not necessary to have two different chromogenic, e.g., EC panels to provide this functionality. Control over several independent sections of a chromogenic panel can be provided in one monolithic device, as shown in the illustrative embodiment of FIG. 2B. To fabricate a device having two independently controllable EC sections, the transparent conductive coating 17 may be removed from upper substrate 10 and the coating 27 removed from lower substrate 20 by etching along a line 25 as shown in FIGS. 2B and 2C so as to divide the conductive coatings into separate parts on each substrate. The width of the etched line can be from 0.01 mm to several mm. Busbars 21, 22 are then deposited on each of the sections as shown.

As mentioned, the busbars can be silver frits, but conductive tapes or soldered lines may alternatively be used. One substrate is then coated with e.g., tungsten oxide and the other with a counterelectrode. Examples of counterelectrodes are vanadium oxide doped vanadium oxide mixed with oxides of cerium, titanium, niobium and nickel and manganese oxide based systems described above. The cell is assembled with these two substrates facing inwards with the electrolyte in between. Since, electronically the two sections are not connected together one could only power one section and not the other.

FIGS. 2, 3, and 4 show that a transparent conductive layer 15, 21 or 45, 35 has been etched, preferably on both substrates 10 and 20, respectively. If different chromogenic sections have to be controlled independently to a different transmission or color, then it may be preferred to etch both.

The partitioning mechanisms of FIGS. 2C, 3B or 4 may thus advantageously be used to section car sunroofs where each section is independently controllable. Similarly, an electrochromic windshield may be effected that has a sunshade band at the top which could be a different section from the rest, and even have different chromogenic properties, as described above while the remainder of the windshield need not be chromogenic; meaning either that the EC layer or the conductive layer underneath may have be removed or not deposited. Alternatively, one may use a substrate which is only as big as the required visor and which is then fabricated in to a device by laminating onto a larger substrate such as the entire windshield. Another example can be a chromogenic cover for the instrument panel for the car. This instrument panel can have different sections and the transmission of each section could be independently controlled to provide the desired functionality or to maintain the most desirable vision/least glare from a driver's perspective. Since EC technology has variable control, the different sections can be controlled to different depths of transmission. For instrument panels, it is preferred that the EC devices have a photopic range of more than 70% down to less than 20%. Further antireflective coatings on these panels will keep the visual interference from reflected light low. The car windows can also be sectioned to maximize the passenger and/or driver comfort.

EC Device Processing

As mentioned, chromogenic panels may be flat or curved, e.g., for a car glazing such as a sunroof To make a chromogenic device such as an EC device for a sunroof, the preferred methods are disclosed below. This method preferably employs two substrates, but those with one substrate with all thin film construction can use the same method as well. For example, the outer substrate for the sunroof can be a dark glass with a thickness of 2.5 to 6 mm, preferably 2.8 to 4.5 mm, GL20, GL35 or Optibronze™ (all from PPG, Pittsburgh, Pa.) are typically 4 mm thick. The outer glass should be of a thickness capable of being strengthened or tempered, which typically requires a thickness of about 2.5 mm or more. However, as the thickness increases the weight increases. The max strength to weight ratio is achieved with a thickness in the range of about 3 to 4 mm. Preferred photopic transmission lies in the range of 20 to 80%. Flat sheets of this glass can be patterned with the silver busbar frit. The glass is then bent and tempered (or strengthened) while also curing the silver fit, all in one process, (the bending of the outer piece of glass for the EC device should have the silver frit on the concave side). A dark non-conductive frit may also be applied to the glass along with the silver frit as long as the silver frit is not masked. The silver frit may also be deposited on top of the dark non-conductive frit. A transparent conductive coating such as indium tin oxide (ITO) is deposited on the substrate so that it contacts the silver frit. The ITO processing preferably takes place at or below 400C. During bending and strengthening, the frit is heat treated to the final state, but the atmosphere (such as oxidizing and/or reducing (either one of these or in a sequence of any one of these followed by the next one)) could also be controlled so that the ITO conductivity increases and its transparency increases by optimizing its stoichiometry (cation to oxygen ratio in the oxide coating) and the crystal grain size. The second substrate could be similarly processed and be tinted or clear. However for this case the frit and conductive coating will be on the convex side of the curvature. One may even deposit ITO before the frit deposition and bending and strengthening operation. Since it is desirable that the curvatures of the two is substrates be matched, it is preferred that both of the substrates be bent together as a pair or bent separately using a mold.

The second substrate in the above case could be similar in thickness to the outer glass or be thinner, preferably in the range of 1 to 3 mm to keep the weight low. One may even use the conventional TEC glass (from Pilkington LOF, Toledo, Ohio), TCO glass from AFG (Kingsport, Tenn.) or Sungate 500 from PPG (Pittsburgh, Pa.) which has a fluorine doped tin oxide coating on one side of the glass. This glass can be clear or colored, where the color could be introduced from coatings or layers below the conductive layer (an example being Solar E glass from Pilkington LOF). The color of this glass could be different or have a different coloration depth as compared to the outer glass. Preferred photopic transmission of this glass is in the range of 20 to 90%. If this glass is thin, this may not be amenable for tempering or strengthening to the same extent as the thick glass. However when the outer and the inner glass are laminated together to form the EC device, the composite could still meet all the automotive safety requirements from a crash simulation or an equivalent test (e.g., Society of Automotive Engineer's test Z26.1–1990). To meet the safety regulation one may use both glasses which are thin, and still pass this test depending on the mechanical properties of the electrolyte film. Another way to meet the test requirements without strengthening the inner panels is by laminating them with plastic laminates such as Spallshield™ and Sentryglass™ by Dupont (Wilmington, Del.). Several Fluorine doped tin oxide coated glasses keep their conductivity even after bending and strengthening operations.

The substrates are then coated, e.g., one side with tungsten oxide and the other side with a counter-electrode and then either laminated with a electrolyte film and edge sealed to prevent ingress of moisture and other atmospheric elements, or made into the EC device by edge sealing to form a cavity and then filling this cavity with the electrolyte (e.g., a method for this is given in U.S. Pat. No. 5,856,211, which is incorporated herein by reference). Further, if the counter-electrode is such which may require a high temperature treatment typically greater than 400C, one might consider depositing this before the glass is bent and/or strengthened, so that the same heat treatment could be used to heat treat this coating as well. On one of the substrates the conductive coating may be deposited first before the frit was deposited, and on the other substrate, the frit may be deposited first, followed by the transparent conductor.

The principles of these constructions and the way to process devices with bent or flat glass can also be used for those devices where no active EC or other chromogenic coatings are required. These devices use liquid crystals, suspended particles or EC devices which use at least two redox species in the electrolyte UV protection can be provided by incorporating additives known in the art to the electrolyte, glass substrates and/or coatings which are deposited on them (which may be on surfaces external to the device and even further laminating them with materials which provide the UV barrier). Many of these are explained in the references cited and for example in U.S. Pat. No. 5,864,419 (which is incorporated herein by reference).

The principals of EC device construction are not limited to automotive and other transportation glazing, but any application which will benefit from this invention, including architectural glazing, decorative chromogenic tiles, lamp covers, displays, mirrors, appliances, cabinets, etc.

Powering Of Chromogenic Devices

The power to the chromogenic element of sunroof can be delivered in several ways. The power supply to the chromogenic panel can be optionally integrated as one unit with the power supply that is used for powering other functions of the sunroof such as sliding and tilting. Further the power supply may even be optionally integrated to provide power to even other car functions e.g., to power the header console or the car interior, including electrochromic mirrors, lights, displays, communication (within internal car functions and external functions such as remote keyless entry or radio and microwaves), and locks. Different functions require different power characteristics (such as voltage, alternating current or direct current), thus they need to be appropriately shielded to reduce interference. Amongst other benefits combining several functions in one power supply will reduce the current drain on the car and cost.

Power supplies for the electrochromic devices are extensively described in patent application Ser. No. 09/347,807. Electrochromic devices which have a intercalatable counterelectrode and an EC electrode (such as tungsten oxide including doped tungsten oxide) separated by an electrolyte layer can be powered as discussed below: the electronics will be capable of powering preferably in a range of +2V to −2V. The applied voltage will be dependent on the amount of coloration required in the EC cell. The cells can be powered by a constant current (preferably, lower than 1 A/sq.ft of EC area) but limited by a max. voltage (within the preferred range of +/−2V). The maximum voltage and the maximum current will depend on the cell temperature (thus an input for cell temperature will be required). The voltage will be lower at higher temperatures.

To keep the power consumption low it is preferred to use switching power supplies to step down all or part of the potential from the battery to the applied potential. One may use the switching power supply to step down the potential to say 3V or 5V, and then use the linear regulation to tune it to the specific potential. Switching power supplies are those which use a DC to AC conversion and then back to DC to conserve power. This conversion is done by capacitive or inductive coupling. This becomes more important if the main battery voltage is higher. Typical output of DC batteries used in transportation range from 42 to 12 Volts. Between the input and the output voltages the conversion efficiency of switching power supplies is greater than 50, and most times greater than 70%. Some sources of such power supplies are Maxim Integrated Products, Inc. (Sunnyvale, Calif.), Linear Technology Corporation (Milpitas, Calif.). These high efficiency switching regulators using inductors or capacitors are sold under many generic names, some of these are: high efficiency switching regulator; high efficiency switching regulator; high efficiency switching voltage regulator; high-efficiency switching step-down converter; high-efficiency pwm step-down controller; micropower 600 khz pwm dc/dc converter; step-down switching regulator; high efficiency, synchronous step-down switching regulators; high-efficiency step-up converter; wide input range, high efficiency, step-down switching regulator; high efficiency in switching regulator using capacitor, switched capacitor voltage converter; switched-capacitor wide input range voltage converter; micropower, regulated 5v charge pump dc/dc converter; high efficiency inductorless step-down dc/dc converter; switched capacitor regulated voltage regulator; 5v regulated charge pump; step-up/step-down switched capacitor dc/dc converter. Some of these from Linear Technology are designated LT1026, LT1054, LTC1144, LTC1503-1.8/LTC1503-2, LTC1515, LTC1516, TC1550/LTC1551LLT1070/LT1071, LT1074/LT1076, LT1170/LT1171/LT1172, LT307/LT1307B, LTC 1929. Some of these from Maxim are designated MAX887H, MAX682/3/4MAX738A, MAX758A, MAX1684, MAX1715, and MAX1636.

Glazing for Boats

The above constructions can be used to make glazing for the boats. This invention is particularly suitable to make glazing for cabins and the bridge (navigation room) of the boats. The boats need to be navigated both during the day and at night. When tinted glazing is used for this, so that the people in the room can be protected from harsh Solar radiation during the day, the same tinted glazing causes poor visibility in the late evenings and night. Thus use of chromogenic glazing in this application will enhance comfort and safety. Further, the reflection of the sun from water may also result in blinding glare. Since the light reflected from the water is polarized, one could use a polarized sheet which is incorporated within the chromogenic glazing and further enhance the comfort and safety. The use of polarizer in the device which will polarize the light perpendicular to the reflected light will result in blocking the specular reflections from the water. A "sandwich" made of a glass substrate, laminating material, polarizing layer, another laminating layer and a chromogenic element layer, in which the glass substrate faces the outside is desirable. In this construction, both the chromogenic element and the polarizer can be protected by UV radiation from the UV blocking characteristics of the substrates and/or the UV blocking characteristics of the laminating material such as polyvinylbutyral, polyurethane or polyvinylchloride. The laminating materials have UV blocking additives (or stabilizers). Also the other side of the EC element may also be optionally laminated to block UV entering from the other side. The UV blocking characteristics also protect the interior of the boat against aging and fading from the Solar UV radiation. Further, one may provide silver or other busbars on the inside of the glass substrate or the outside surface of the EC element for defogging. Another set of busbars could also be introduced for antenna of radio and microwave signals. One could also coat the outer surface of the glass with hydrophilic coatings for water to spread out or hydrophobic coatings for water to bead-up so that good visibility is maintained even when water droplets hit the surface. One may also coat the outer surface with titania to provide for self cleaning properties and/or hydrophillicity (e.g., see JP11228865A, JP10277403A and JP10140046A). The preferred transmittance range for a boat glass should be greater than 30% photopic, and more preferably greater than 60% photopic in the bleached state. In the colored state the photopic transmission should be less than 25%, and more preferably less than 10%. The preferred colors are again warm and neutral colors. However, the green and blue colors are also acceptable in this industry, The use of colored and or contoured substrates or cover glasses which have the desired colors and design will assist in matching of the exterior appearance.

Display Filters

Display filters, especially those that are to be compatible with night vision systems may profit from the application of the illustrative chromogenic assembly with polarizing materials. For example for military uses one may use static filters in front of displays to block out the near Infrared (NIR). This is done so that in the evening/nighttime when the vehicle or airplane operations personnel use night-vision system, they do not get blinded with the NIR being emitted from the displays. These filters should meet the Military Specifications MIL-L-85762-A. According to this specification various color filters are used for the Night Vision Imaging System (NVIS). These are typically NVIS Green A, Green B, Yellow and Red. This standard requires that the displays not exceed NVIS radiance of $1.7 \times 10^{-10}$ when lightening produces 0.1 fL display luminance. The warning or master caution signals may be brighter, at levels between 50 and $1.5 \times 10^{-7}$ with source luminance levels up to 15 fL for class A Type 1 goggles. NIR for night-vision being defined at least the region between 700 and 1100 nm. Typical glass compositions used for this purpose contain $P_2O_5$ in their compositions in the range of 30 to 60 mole % and copper (ll) oxide (CuO) in less than 40 mole %. These are described in U.S. Pat. No. 5,234,871 and in U.S. Pat. No. 5,036,025, which are both incorporated by reference herein. There are other glass forming ingredients in these compositions which are described in the above references. One such phosphate glass is S-8022 (2 mm thick glass) and S-8023 (3 mm thick) glass from Schott Glass technologies lnc.(Duryea, Pa.) which transmits in green. Glasses which transmit white light, yellow and red are for example available from Oxley Avionics (Branford, Conn.) or Kopp filters from Bes Optics Inc (W. Warwick, R.I.). Many of these colors are produced by laminating at least one of the glass substrate which has copper and phosphorous as described above with a substrate which has other desirable spectral characteristics. The purpose of this invention is to provide the night vision capability to the filter and also user controllable optical transmission. This can be done if at least one of the substrates in a chromogenic device has such glass composition. The schematics of construction of various chromogenic devices are shown in PCT 98/08137. Yet another way to provide this functionality is to take a regular glass and coat this by a composition of material, such as the glass described above, and then use these substrates for device building. Coating methods such as physical vapor deposition, wet chemical deposition, etc. may be employed. Wet-chemical route is preferred due to the several components in such coating mixture, thus controlling the homogeneity.

Display glasses can also be made to deliver high contrast, particularly for the full color displays. These glasses are such that only the specific wavelengths at the phosphors emit will be transmitted. These can be further combined with antireflective coatings to give bright displays even in full sunlight. For example phosphor P43 will have emission bands at 544 and 445 nm and Phosphor P22 will emit at 525 and 630 nm. Thus the glass should have high transmission at these specific wavelengths. Typically glasses with multiple absorptions contain at least $Nd_2O_3$ and optionally erbium oxide ($Er_2O_3$). Typical range of this is between 2 and 20% of the glass composition. As above, glass will also contain other oxide ingredients to impart other properties, such as silica as network former, additives for UV suppression, enhancement of absorption in other wavelengths, viscosity modification, durability enhancement. Examples of these are given in U.S. Pat. No. 5,190, 896, which is incorporated herein by reference. As described for the night-vision system chromogenic display filters, which can change their transmission with change in ambient lighting and still maintain high contrast can be made by using at least one of such substrates in their construction. For example a night vision system display filter could be made by combining a said copper containing phosphate based substrate and a said neodymium based substrate in a chromogenic device. An example of a night vision compatible filter which transmits in specific wavelengths for high contrast is made by Wamco (Fountain Valley, Calif.) called NV-2MC. Some of the glass surfaces may have to be coated with a barrier coating such as a $SiO_2$ having a thickness range of 10 to 1000 nm. The transparent conductor is then deposited on the barrier coating. The barrier coating prevents undesirable leaching of cations from the glass and their subsequent transport into the conductive and other layers.

EXAMPLE 1

Fabrication of Electrochromic Devices (Devices 1,2 and 3) with Tungsten Oxide Electrochromic Layer but without Intercalating Counterelectrode.

A 3×3 inch EC window device (Device 1) was made using TEC 15 (from Pilkington LOF, Toledo, Ohio). The tungsten oxide coating, a lithium tungstate ($Li_{0.3}W)O_x$, was deposited on TEC 15 glass. (This is not a reduced form of tungsten oxide as lithium is present as an oxide.) The thickness of the fired coating was 360 nm. The coating was fired in a humid atmosphere followed by a heat treatment up to 250C. Details of deposition and precursor used can be found in comparative example 1 of PCT 97/05791. The coating was then etched from the perimeter area (about 10 mm in width) of the substrate. A cell was fabricated by dispensing an epoxy around the perimeter of one of the substrates. This epoxy contained 210 micrometer (diameter) spherical glass beads. The epoxy was dispensed on the etched area. The second TEC 15 substrate was lowered onto this one while providing an offset of about 5 mm along one of the edges. This substrate had two 1.6 mm diameter holes along its diagonal about 10 mm away from these corners. Care was taken that the epoxy touched the tungsten oxide coated substrate in the etched area. The spacers provided a separation of 210 micrometers between the two substrates, which would be the thickness of the electrolyte. The preferred thickness of the electrolyte is between 37 micrometers to about 5 mm. The epoxy was cured at elevated temperatures (typically in the range of 80 to 200C). Typical curing time is between 10 minutes to a few hours. Injecting through one of the holes filled the electrolyte. The electrolyte contained (all weight %) 0.35% ferrocene, 10.5% $LiCF_3SO_3$, 48.9% PC, 32.6% sulfolane and 7.65% of polymethylmethacrylate with a molecular weight of about 540,000. The holes were then sealed with Teflon plugs followed by glass cover slides which were bonded by a UV curable adhesive. Alternatively, the plug area may be sealed with metallic caps, as described in Example 4. To further enhance the environmental barrier the edges of the cover slide were covered with a thermally cured epoxy.

The same process as described for device 1 was used to make device 2, but the tungsten oxide coating solution also included chromium. The composition of the coating was $(Cr_{0.001}Li_{0.3}W)O_x$. The electrolyte was composed of (all compositions are based on weight %) 0.8% t-butyl-ferrocene, 0.6% $LiCF_3SO_3$, 3.7% Ethyl 2 cyano 3'-3 diphenylacrylate (UV stabilizer), 45.4% PC, 31.7% sulfolane and 8.2% of polymethylmethacrylate with a molecular weight of about 540,000.

Another device (Device 3) was made where the coating was $Cr_{0.005}Li_{0.3}W)O_x$. The electrolyte in Device 3 was 1.0% t-butyl-ferrocene, 20% $LiCF_3SO_3$, 1% Ethyl 2 cyano 3'-3 diphenylacrylate, 73% PC, and 5% of polymethylmethacrylate with a molecular weight of about 540,000.

The devices were colored by applying 1.2 volts (tungsten oxide electrode was negative) and bleached at −0.3 volts. The L*C*h and photopic transmission values of the three devices is shown in Table 1. Also shown in this table are measured values of Cover Glass GL20, GL-35 and Optibronze respectively. When the above devices are combined with these glass covers (all 4 mm thick) by overlaying them on devices, their composite L*C*h and photopic transmission values are also shown in this table. The table also shows how using different cover glasses can control the color perception of the devices.

|  | L* | C* | h | Photopic (% T) | Color Perception* |
|---|---|---|---|---|---|
| Bleached EC devices | | | | | |
| Device 1 | 88.5 | 10.5 | 108.4 | 73.1 | |
| Device 2 | 86.9 | 16.7 | 104.6 | 69.9 | |
| Device 3 | 87.1 | 17.3 | 104.3 | 70.3 | |
| Colored EC devices | | | | | |
| Device 1 | 68.3 | 13.0 | 221.0 | 16.1 | Blue |
| Device 2 | 47.2 | 21.0 | 236.9 | 16.1 | Blue |
| Device 3 | 50.0 | 16.9 | 229.5 | 18.4 | Blue |
| Cover Glasses | | | | | |
| GL-20 | 46.7 | 0.94 | 243.2 | 15.8 | Neutral |
| GL-35 | 65.8 | 1.6 | 125.3 | 35.0 | Neutral |
| Optibronze | 58.9 | 23.2 | 72.8 | 26.9 | Warm |
| Bleached EC devices with GL-20 | | | | | |
| Device 1 | 40.3 | 5.4 | 115.0 | 11.4 | Neutral |
| Device 2 | 39.5 | 8.9 | 109.1 | 10.9 | Neutral |
| Device 3 | 39.5 | 9.1 | 108.8 | 11.0 | Neutral |
| Colored EC devices with GL-20 | | | | | |
| Device 1 | 24.5 | 9.6 | 240.9 | 2.5 | Neutral/Blue |
| Device 2 | 17.4 | 11.9 | 244.9 | 2.4 | Neutral/Blue |
| Device 3 | 19.9 | 8.9 | 233.4 | 3.0 | Neutral/Blue |
| Bleached EC devices with GL-35 | | | | | |
| Device 1 | 57.6 | 8.9 | 110.8 | 25.5 | Neutral |
| Device 2 | 56.5 | 13.2 | 106.7 | 24.4 | Neutral |
| Device 3 | 56.6 | 13.6 | 106.4 | 24.5 | Neutral |
| Colored EC devices with GL-35 | | | | | |
| Device 1 | 38.1 | 11.1 | 230.4 | 5.4 | Neutral/Blue |
| Device 2 | 27.8 | 14.4 | 237.1 | 5.4 | Neutral/Blue |
| Device 3 | 30.4 | 11.3 | 226.5 | 6.4 | Neutral/Blue |
| Bleached EC devices with Optibronze | | | | | |
| Device 1 | 51.5 | 26.1 | 79.0 | 19.7 | Warm |
| Device 2 | 50.6 | 29.2 | 80.5 | 18.9 | Warm |
| Device 3 | 50.8 | 29.6 | 80.7 | 19.1 | Warm |
| Colored EC devices with Optibronze | | | | | |
| Device 1 | 31.2 | 6.1 | 125.3 | 3.8 | Neutral |
| Device 2 | 23.2 | 5.9 | 174.5 | 3.9 | Neutral |
| Device 3 | 24.4 | 5.9 | 142.8 | 4.2 | Neutral |

EXAMPLE 2

Fabrication of an Electrochromic Device (Device 4) with Tungsten Oxide Electrochromic Layer but with Vanadium Oxide Intercalating Counterelectrode. These are Small Devices, thus Prior Deposition of Busbars such as Silver Frits is not Required A 3×3 inch EC window device (Device 4) was made using TEC 15 (from Pilkington LOF, Toledo, Ohio). The tungsten oxide coating, lithium tungstate ($Li_{0.3}W$)Ox, was deposited, as described earlier, on TEC 15 glass. This is not a reduced form of tungsten oxide as lithium is present as an oxide. The thickness of the fired coating was 350 nm. Another piece of similar sized TEC 15 was coated with a vanadium oxide coating (counterelectrode). Both the electrodes in the cell store or intercalate ions. Both electrodes posses electrochromic properties, but the doped tungsten oxide imparts stronger coloration. This substrate had two small holes (about 1/16 of an inch) about 1.5 cm from two of its diagonal corners. The deposition of the vanadium oxide coating was also done by wet-chemical deposition. Weighing out and mixing the components in the following order made the coating solution: 12 g of iso-propyl acetate, 3 g of vanadium triisopropoxide oxide and 1.77 g of 2-ethylhexanoic acid. The mixture was left standing for 10 minutes before using. The coating was deposited by spin coating and then placed in an oven at 80C. The coating was fired up to 400C. Preferred firing temperatures are in the range of 300 to 500C. However, if strengthened glass were used to make these devices, it is preferred that the firing temperatures be kept below 400C, and more preferably below 350C. The heating rate from room temperature was 10C/minute and was kept at the temperature for 2 hours. The coatings were cooled to about 50C in the oven by turning it off and leaving overnight and then removed. The coating thickness was 170 nm. This coating was also etched around its perimeter in a width of about 10 mm.

A cell was fabricated by dispensing an epoxy around the perimeter of one of the substrates. This epoxy contained 210 micrometer (diameter) spherical glass beads. The epoxy was dispensed on the etched area. The second substrate was lowered onto this one while providing an offset of about 5 mm along one of the edges. Care was taken that the epoxy touched both the substrates in the etched area. Spacers provided a separation of 210 micrometers between the two substrates to accommodate the electrolyte. The preferred thickness of the electrolyte is between 37 micrometers to about 5 mm. The epoxy was cured at elevated temperatures (typically in the range of 80 to 200C). Typical curing time is between 10 minutes to a few hours. On the conductive side of the offset area, a soldered busbar was deposited and connected to an electrical wire. The cell was filled with 1.0M lithium triflate and 0.05M Ferrocene in propylene carbonate (PC). All the liquids used to process the cell should have low water content, preferably below 1000 parts per million, and more preferably below 100 parts per million. This was introduced through one of the two holes (fill port) in one of the substrates. The holes were temporarily plugged with plastic inserts. A DC voltage of 1.2V was applied to the cell with the tungsten oxide being negative for about 2 minutes. The cell colored to a deep tint due to the reduction of tungsten oxide by lithium ion insertion. The solution was then flushed out of the cell. It was refilled with ethanol and flushed several times, and then the cell was filled by a solution of 1 molar lithium triflate in PC to clean out any residue. The cell was colored and bleached completely several times (3 to 5 times) by applying −1.2V and +1.2V, with respect to the tungsten oxide. It is important to reverse potential once the cell reached a steady state transmission level. The cell was again flushed several times with ethanol and it was quickly placed under dry conditions, preferably in a glove box which has an inert atmosphere.

The cell is then filled with the electrolyte, which is typically a dissociable salt in a medium. Preferred salts include lithium triflate, lithium methide and lithium trifuoromethanesulfonimide (trade name HQ 115 available from 3M specialty Chemicals, St. Paul, Minn.). Preferred solvents are polar solvents such as sulfolane, methyl sulfolane glyme, PC, gamma-butyro-lactone, etc. In this example 1.5M salt in sulfolane was used. The components were dried so that the electrolyte had a water content of less than 30 ppm. Typical salt concentration is chosen from 0.1M to 3M. After this the two holes (fill ports) are sealed. One may use UV curable or thermally curable adhesives. One may also use mechanical plugs followed by adhesives along with cover plates made out of metal, glass or plastic, this is also described in the U.S. Pat. No. 5,856,211 which is disclosed herein by reference. These plates may be used in addition to the mechanical plugs as described above. One may even use plates which may be bonded by ultrasonic means. This method is described in greater detail later. The electrolyte can also contain water and oxygen scavengers; polymeric thickeners (such as polymethylmethacrylate, polyethers such as polyethylene and polypropylene oxides, fluorinated polymers such as polyvinylidene fluoride sold under the trade name of Kynar (Elf Atochem, Philadelphia, Pa.); inorganic viscosity modifiers such as fumed silica and other such inorganic fillers: UV stabilizers, other salts, colorants and dyes, etc. In the final electrolyte one may even add a little of reversible and/or non-reversible redox agents such as metallocenes, preferably ferrocene and its derivatives to restore the charge (e.g., Lithium ions) as the device with an EC electrode and a counter-electrode ages. Typical concentration of the redox agent is lower than 0.05M, but preferably lower than 0.005M. The addition of redox agents in electrochromic cells with two ion insertion electrodes is described in U.S. Pat. No. 5,215,684 for EC cells consisting of specific electrodes, electrolytes and salts. This patent is incorporated herein by reference. The aforementioned patent does not, however, describe the addition of these materials in electrochromic cells with ion insertion electrodes of mixed oxides, vanadium oxide containing counter electrodes and in cells containing electrolytes with either sulfolanes, lithium trifuoromethanesulfonimide and mixed salts, low water contents and with UV stabilizers.

As described above, a novel procedure was employed for reducing the electrodes in a cell (or inserting ions in one of the electrodes) where a EC device is made with two opposing electrodes where both function by ion insertion, in this case tungsten oxide and vanadium oxide respectively. In a typical prior art process, one of the electrodes is pre-reduced generally by an electrochemical process. These processes are difficult to control for uniform ion-intercalation, particularly with increasing device size. Further, once reduced, the electrode is vulnerable to re-oxidation in further processing, particularly if it is handled under ambient conditions and more so at elevated temperatures such as seal curing or other steps. Further, this kind of reduction could be expensive as large vats of electrochemical mediums are required to reduce large substrates. In accordance with an aspect of the invention, it is preferred to complete the cell processing as much as possible before such reduction. In this example the cell cavity was fabricated before the reduction process was employed. Further a liquid medium (e.g., propylene carbonate, sulfolane, etc.) containing at least one anodic and/or one cathodic redox material along with a dissociable salt (e.g., lithium perchlorate, lithium triflate, etc.) was injected into the pre-fabricated cavity. One of the cell electrode was reduced by applying a voltage. After reduction the medium was flushed. During the flushing process one may choose to continue to apply the potential as well if there is an evidence of re-oxidation while flushing. The second step described above was cleaning with ethanol. In this step other polar or non-polar solvents may also be used for cleaning, such as acetonitrile, propylene carbonate, hexane, etc., or one may even skip this process by simply introducing pressurized nitrogen and argon to flush the cell clean. The procedure described above is one of many that may be employed and one may even skip the step where the cell is filled with an intermediate electrolyte and cycled a few times prior to the introduction of the final electrolyte. For example, in a simple process, one may simply flush the reducing medium out using inert gases described above and fill the cell with the final electrolyte and seal. The solvent system used in the final electrolyte may be a mixture of sulfolane and its derivatives (e.g., methyl sulfolane). Typically co-solvents to sulfolane are typically added up to 50% of sulfolane. The electrolyte in this case was sulfolane with 1.5 molar lithium trifuoromethanesulfonimide. Examples of other preferred additives or alternatives are co-solvents methyl sulfolane, propylene carbonate, □-butyrolactone, polyethylene glycol, glymes; preferred UV stabilizers are benzophenones and benzotriazoles, e.g., Uvinul 3000, Uvinul 3050 (from BASF, Mount Olive, N.J.) and Tinuvin 213 (Ciba Specialty Chemicals, White Plains, N.Y.); salts such as lithium triflate; and thickener additives such as polyethers (polyethylene oxide/polypropylene oxide copolymer) and nano-particle inorganic oxides such as fumed silica, in situ polymerizable urethane monomers capable of crosslinking (typically an isocyanate terminated monomer, hydroxy terminated monomer and a tin catalyst). The concentration of each of the UV stabilizers and the polymeric and/or monomeric additives is typically less than 20 wt % and preferably less than 10 wt % of the solvents.

The reversible redox promoter in this case was a reversible metallocene, e.g., ferrocene and coboltocene or their derivatives. In this case tungsten oxide and vanadium oxide are used as the two opposing ion-insertion electrodes with ferrocene as the redox promoter, but one can choose any organic or inorganic which can reversibly intercalate ions. Some prominent electrodes are molybdenum oxide, niobium oxide, Cerium-titanium oxide, Titanium-vanadium oxide, Niobium-vanadium oxide and so forth. A more extensive list of electrodes for EC devices is in patent application Ser. No. 09/443,109.

One may even choose a non-reversible agent in the electrolyte which will reduce the electrodes by being activated by temperature and/or radiation such as UV. Such agents are typically non-reversible. This is explained in U.S. Pat. No. 5,780,160 which is incorporated by reference. One such agent to reduce the electrode is ascorbic acid.

During the fabrication of the device care was taken to use materials in seals and the electrolyte so that electronic conductivity was suppressed. The leakage current in these devices in the fully colored state at 85C was difficult to measure with the instruments we used as it was lower than 0.05 $\mu A/cm^2$. Leakage current means the current required to keep a device in a required state of transmittance. When a EC device is colored to a desired set point, there is power consumed to color the device to this desired transmission and then there is power consumed to keep the device at that level of transmittance. The leakage current is related to the latter. Once the desired state is reached and the power source is removed the device discharges and this is seen as a change in transmission. Thus to keep that level of transmission there are two alternatives. In the first one the power source is not removed so that continuous current is fed in to the device to compensate for the discharge. Alternatively, one can let the device discharge so that its transmission level changes (typically small enough that the user is unable to perceive) and then reapply power to bring it back to the desired state of transmittance. In this case the current is fed intermittently. In either case the feeding of charge is required, this charge is typically drained from the battery, or there is a leakage of charge from the battery. This leakage of charge will eventually drain the battery. Thus to keep the battery drain low in a parked automobile and prolong battery life this leakage (or average leakage current, if intermittent power is supplied) needs to be at a low desired number as given earlier. This leakage current should preferably be measured at the battery. For intermittent powering of the electrochromic device the discharge in the device can be measured e.g., by optical sensors or electronically (such as open circuit potential of the cell). Another way of specifying low leakage current also is to specify change in device transmittance when the power is removed (open circuit). Once the device was colored, it changed by less than 1% photopic transmission in 15 minutes when stored at 85C without any voltage being applied and changed by about another 0.5% in the next 35 minutes. It is preferred to have devices which change less then 5% of their transmission when stored at 85C for 15 minutes without any external application of potential (open circuit). In the counterelectrode devices, one of the important variables to get low leakage is to keep the water content lower than 2000 ppm, preferably lower than 100 ppm and most preferably as low as 10 ppm.

|  | $L^*$ | $C^*$ | h | Photopic (% T) | Color perception |
|---|---|---|---|---|---|
| | | Bleached EC device | | | |
| Device 4 | 79.6 | 6.3 | 173.2 | 57.8 | neutral |
| | | Colored EC device | | | |
| Device 4 | 51.9 | 27.3 | 148.4 | 13.8 | green |
| | | Cover Glasses | | | |
| GL-20 | 46.7 | 0.94 | 243.2 | 15.8 | neutral |
| GL-35 | 65.8 | 1.6 | 125.3 | 35.0 | neutral |
| Optibronze | 58.9 | 23.2 | 72.8 | 26.9 | warm |
| | | Bleached EC device with GL-20 | | | |
| Device 4 | 35.6 | 3.6 | 186.8 | 9.1 | neutral |
| | | Colored EC device with GL-20 | | | |
| Device 4 | 20.7 | 14.6 | 146.8 | 2.1 | neutral/green |
| | | Bleached EC device with GL-35 | | | |
| Device 4 | 51.5 | 5.2 | 162.9 | 20.3 | neutral |
| | | Colored EC device with GL-35 | | | |
| Device 4 | 32.3 | 19.8 | 145.1 | 4.7 | neutral/green |
| | | Bleached EC device with Optibronze | | | |
| Device 4 | 45.5 | 18.4 | 84.3 | 15.5 | warm |
| | | Colored EC device with Optibronze | | | |
| Device 4 | 25.6 | 20.9 | 114.7 | 3.5 | warm/neutral |

EXAMPLE 3

Preparation of a EC Device (Device 5a,b) which uses LiMnNiO Counterelectrode

A solution to deposit LiMnNiO electrode was prepared as follows. 1.56 g of lithium methoxide was dissolved in 50 ml of distilled ethanol. Separately 9.28 g of Nickel(ll) ethylhexanoate (78% in 2 ethylhexanoic acid) and 18.81 g of manganese(ll)2-ethylhexanoate (40% in mineral spirits) were mixed and stripped off in a rotary evaporator (@90C) of about 8.91 g of volatiles. After this 8.91 g of ethanol was added. The two solutions were then mixed together. After they dissolved in each other, a uniform phase was obtained which was used as a the coating solution. The substrate (TEC15) was coated by spinning and then fired up to 450C under conditions similar to the vanadium oxide described above. The coating thickness was 180 to 200 nm depending on the spinning conditions. A cell (Device 5a) was prepared with tungsten oxide as the other electrode as described above in the case of vanadium oxide. The cell was filled with 1.5M lithium perchlorate in PC and sealed. This cell did not require any pre-reduction because the lithium from the LiMnNiO electrode could be extracted as Li+ ions upon applying a coloring voltage to the cell and inserting the extracted lithium reversibly into the tungsten oxide. This has many advantages in terms of processing of the EC devices. Particularly, if one needs to laminate the two substrates with a pre-formed electrolyte film, then one can easily handle these substrates in ambient conditions. A 3×3 inch sample was colored at 1.8 volts and bleached at −1.8 volts. The sample colored from 59% photopic to 8% photopic in 54 seconds and it bleached to the original value in 71 seconds. It was also found that the bleach rate was not affected when the bleach potential was lowered to −0.1V. Another sample (Device 5b) was made in the same size to measure color. The sample in the bleach state had 56.5% photopic transmittance. It was colored to 17.5% photopic transmittance and its color was measured again. The table below describes the is details.

|  | L* | C* | h | Photopic (% T) | Color perception |
|---|---|---|---|---|---|
| Bleached EC device | | | | | |
| Device 5b | 79.9 | 21.0 | 91.9 | 56.5 | warm |
| Colored EC device | | | | | |
| Device 5b | 48.6 | 15.5 | 129.7 | 17.3 | neutral |
| Cover Glasses | | | | | |
| GL-20 | 46.7 | 0.94 | 243.2 | 15.8 | Neutral |
| GL-35 | 65.8 | 1.6 | 125.3 | 35.0 | Neutral |
| Optibronze | 58.9 | 23.2 | 72.8 | 26.9 | Warm |
| Bleached EC device with GL-20 | | | | | |
| Device 5b | 35.7 | 11.5 | 96.7 | 8.9 | neutral |
| Colored EC device with GL-20 | | | | | |
| Device 5b | 19.5 | 8.8 | 129.4 | 2.9 | neutral |
| Bleached EC device with GL-35 | | | | | |
| Device 5b | 51.7 | 16.2 | 95.2 | 19.9 | warm |
| Colored EC device with GL-35 | | | | | |
| Device 5b | 28.9 | 11.5 | 130.3 | 5.8 | neutral |
| Bleached EC device with Optibronze | | | | | |
| Device 5b | 46.4 | 31.2 | 76.9 | 15.6 | warm |
| Colored EC device with Optibronze | | | | | |
| Device 5b | 24.9 | 18.8 | 93.6 | 4.4 | warm |

EXAMPLE 4

Ultrasonic Sealing of Plug Holes

This is a novel sealing method to close the plug holes (fill ports) which is described in detail in the already filed patent application DE 100 06 199.0. The welding requires a cover or a plug to be placed on top of the plughole or inside the plughole. This cover (or plug) is then bonded on to the glass by fusing its surface with the glass surface. An ultrasonic oscillator rapidly provides the energy required to do this. The equipment employs a press to place the cover with a certain force covering the hole and contacting the substrate, transducers, ultrasonic generator and controller. An equipment supplier for such a system is Telesonic Ultrasonics (Bridgeport, N.J.) who sells such ultrasonic welding systems. The oscillations are typically rotational or translational with respect to the surface normal. In case of the present EC device the holes are plugged by covering them with thin foils or plates. These foils could be made out of a single material or be alloys and composites. Some of the preferred materials are Al, Cu, Pt, Au, Ti and stainless steel. These could be coated with other metals, oxide layers or polymeric layers. When used with oxide and polymeric layers, the coated side preferably faces the plughole. This layer provides additional inertness, as this will likely be in contact with the electrolyte. Also during the fusion process the polymeric material in contact with the surface is burned away so that proper glass to metal bond is obtained. Another preferred composite material is surface anodized Al foil. One may also coat more inexpensive materials such as Al and Cu with gold and platinum to provide the inertness. One may also use adhesion promotion layers between these dissimilar materials to get good bonding between them. Most of the plugholes sealed were about 1.5 to 3 mm in diameter. The foil size was about 1 sq. cm in area with a typical thickness of 50 to 250 micrometers. The foil was pressed against the substrate with a force of 1000 to 10,000 N and then the ultrasonic energy was applied at 10–501 kHz. The welding time was between 0.1 to 1 second and no further post-processing was needed. This method has several advantages over the method described earlier where adhesives or adhesively bonded cover slides are used to plug the holes. Some of these advantages are:

Hermetic sealing, in particular gas-tightness (e.g. impermeable to He, $O_2$, $CO_2$, water vapor, etc.)

Short operating time and no post-processing is required (lower cost)

Wide material choice for the cover, including materials which are inert towards other cell components Long-term durability and low thermal stresses No exposure or entrapment of environment of the cell contents while sealing Thus this method and the advantages are applicable to the sealing of any chromogenic device.

The foregoing description for the purposes of simplicity has concentrated on chromogenic devices having electrochromic layers. However it will be apparent to those skilled in the art that chromogenic devices employing no electrochromic layers but instead employing an electrolyte having at least one anodic and one cathodic compound together with salts and UV stabilizers, etc, or which use particles suspended in the electrolyte (suspended particle devices) which change orientation under the applied electric field rather than electrochromic layers can be made. Further and other modifications may be made by those skilled in the art without, however, departing from the spirit and scope of the invention.

what is claimed is:

1. A transparent chromogenic assembly, comprising:
a pair of facing transparent substrates defining a cavity for enclosing an electrolyte medium; facing surfaces of the substrates each having a conductive transparent coating,
an adhesive spacer element interposed between said substrates;
said conductive coating of at least one of said substrates being interrupted along a demarcation line to insulate contiguous areas on opposite sides of said line from one another;
the conductive coating of at least one of the substrates being overlain with an electrochromic layer comprising at least one transition metal oxide, preferably tungsten oxide; and
a set of busbars deposed toward the periphery of each of said areas.

2. A transparent chromogenic assembly according to claim 1 having a counterelectrode layer on a surface of said substrates facing the surface containing said electrochromic layer which counterelectrode layer comprises a mixture of at least three oxides, two of which are transition metal oxides and one of which is an alkali metal oxide.

3. A transparent chromogenic assembly according to claim 2 wherein said counterelectrode mixture contains an oxide selected from the group consisting of lithium oxide, nickel oxide and manganese oxide.

4. A transparent chromogenic panel for use on the exterior of a transportation vehicle exposed to the weather requiring an average current less than 100 $\mu A/cm^2$ of active area to maintain any desired state of transmission at a temperature of up to 85C for a duration of at least 8 hours.

5. A transparent electrochromic panel according to claim 4 having inorganic electrochromic and counterelectrodes defining said active area, said electrodes being selected principally from the transition metal oxides, such as tungsten oxide and vanadium oxide, respectively, and having a liquid or solid polymer matrix electrolyte containing a sufficient amount of a sulfolane to act as a solvent and/or plasticizer for said electrolyte and a water content lower than 2000 ppm, preferably as low as 10 ppm.

6. A transparent chromogenic panel as in claim 5 which imparts to the perceiver a warm or neutral perceived color comprising: an active component layer and a passive component layer in which the active component layer is selected from the group consisting of electrochromic, liquid crystal, user-controllable-photochromic, polymer-dispersed-liquid crystal or suspended particle devices and the passive component layer is selected from the group consisting of substrates or covers for the active layer, said active and said passive layers being chosen so that the color and the transmissivity of the passive layer accommodates the range of color change in the active layer to maintain the transmitted color of the panel in a warm or neutral shade, where warm colors on the L*C*h color sphere scale correspond to C having a value between 15 and 45; h having a value between 100 and 20, and where the value of L depends on the darkness of the glass or preferred degree of photopic transmission desired.

7. A transparent electrochromic panel as in claim 6 wherein the neutral colors correspond to C less than 15, preferably less than 5, and h between 0 and 360, while L can be any number yielding the desired photopic transmission.

8. A transparent electrochromic panel according to claim 5 wherein said active component layer comprises:
   a. a pair of facing glass substrates separated by a spacer to define a cavity for an electrolyte medium, facing surfaces of said substrates each having a conductive transparent coating, said conductive coating being interrupted on at least one of said substrates to define individual areas, the conductive coating of at least one of the substrates being overlain with an electrochromic layer;
   b. a set of individually energizable busbars deposed toward the periphery of each of said areas to effect a respective color change therethrough.

9. A device comprising an electrochromic panel and power supply means for energizing said panel at an average current less than 100 microamperes per square cm.

10. A device according to claim 9 wherein said power supply means is a Solar cell.

11. A device according to claim 9 wherein said power supply means employs a switching power supply.

12. A transparent electrochromic panel having active components defined by a pair of facing glass substrates separated by an electrolyte; facing surfaces of the substrates each having a conductive transparent coating and an ion-intercalatable material coating at least one of said coatings being electrochromic, said electrolyte containing at least one dissociable salt; at least one UV stabilizer; a redox promoter, and a water content less then 2000 ppm.

13. A transparent electrochromic panel as in claim 12 where the electrolyte contains at least one redox promoter.

14. A transparent electrochromic panel as in claim 13 wherein said redox promoter is a metallocene.

15. A transparent electrochromic panel according to claim 12 wherein said dissociable salt is any of lithium, sodium or potassium salts.

16. A transparent electrochromic panel according to claim 15 wherein said lithium salt is selected from the group consisting of lithium triflate, lithium methide and lithium trifuoromethanesulfonimide.

17. A transparent electrochromic panel according to claim 12 wherein one of said substrates has an electrochromic coating containing at least an oxide of tungsten.

18. A transparent electrochromic panel according to claim 12 wherein one of said ion-intercalatable electrodes includes at least one of an oxide of vanadium, nickel or manganese.

19. A transparent electrochromic panel according to claim 12 wherein said electrolyte is converted to a solid material by incorporation of at least one of a polymer, in-situ polymerizable monomers or nano-partical inorganic oxide.

20. A transparent electrochromic panel according to claim 12 wherein said electrolyte is thickened by incorporation of at least one of a polymer and nano-partical inorganic oxide.

21. A transparent electrochromic panel according to claim 12 wherein said electrolyte includes a UV stabilizer comprising at least one of benzophenone and benzotriazole.

22. A method of making an electrochromic panel having a pair of facing glass substrates forming a cell cavity for an electrolyte; facing surfaces of the substrates each having a conductive transparent coating where each of these faces is coated with ion-intercalatable electrodes, at least one of which is electrochromic, wherein one of said electrodes is reduced after the cell cavity is formed, comprising:
   a. filling said cavity with a reducing fluid medium containing at least one of an anodic and a cathodic redox material;
   b. applying a voltage at least once to reduce one of said electrodes;
   c. flushing the reducing liquid from the cavity; and
   d. filling said cavity with the electrolyte.

23. The method of claim 22 wherein said redox material is a metallocene.

24. The method of claim 23 wherein said metallocene is selected from the group consisting of ferrocene, a ferrocene derivative, cobaltocene and a mixture thereof.

25. The method of claim 22 wherein said dissociable salt is selected from the group consisting of lithium, sodium and potassium.

26. The method of claim 22 wherein said one of said substrates is provided with an electrochromic layer the composition of which includes at least an oxide of tungsten.

27. The method of claim 22 wherein said ion-intercalatable electrode contains at least one oxide selected from the group consisting of vanadium oxide, nickel oxide and manganese oxide.

28. The method of claim 22 wherein the electrolyte contains each of the following: at least one dissociable salt; at least one UV stabilizer; at least one polar solvent; and a water content less then 2000 ppm.

29. The method of claim 28 wherein the polar solvent is selected from the group consisting of sulfolane, methyl sulfolane, propylene carbonate, gamma-butyrolactone and polyethylene glycol.

30. The method of claim 22 wherein said electrolyte is converted to a solid material by incorporation of a material selected from the group consisting of polymers, in-situ polymerizable monomers and nano-partical inorganic oxides.

31. The method of claim 30 wherein said electrolyte is thickened by incorporation of a material selected from the group consisting of polymers and nano-partical inorganic oxides.

32. The method of claim 22 wherein said redox material is a reversible metallocene.

33. The method of claim 22 wherein said reducing liquid medium contains at least one lithium salt.

34. The method of claim 33 wherein said lithium salt is selected from the group consisting of lithium triflate, lithium methide and lithium trifuoromethanesulfonimide.

35. The method of claim 28 wherein said UV stabilizer is selected from the group consisting of benzophenone and benzotriazole.

36. A method according to claim 22 wherein said reducing fluid is forced out of said cell cavity by a flushing medium consisting of at least one of a polar solvent, non-polar solvent and an inert gas.

* * * * *